Feb. 5, 1957     E. M. McELHINNEY ET AL     2,780,374
LOADER MACHINE
Filed Jan. 27, 1954     2 Sheets-Sheet 1
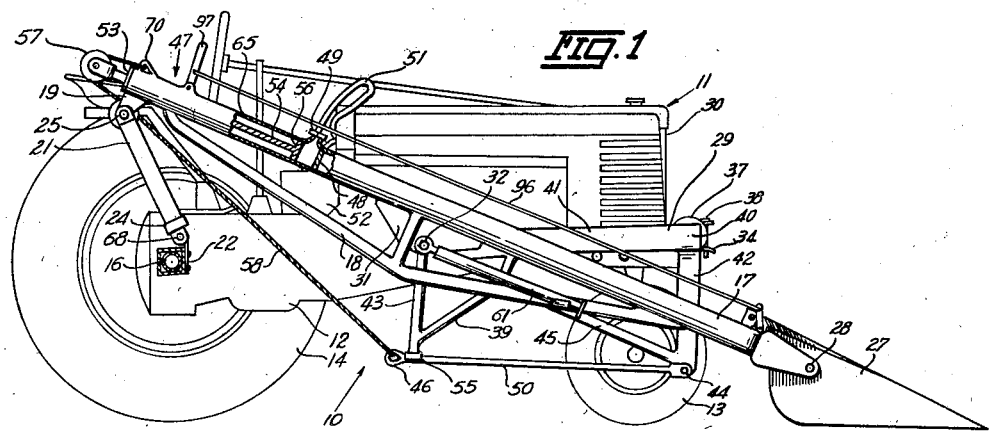
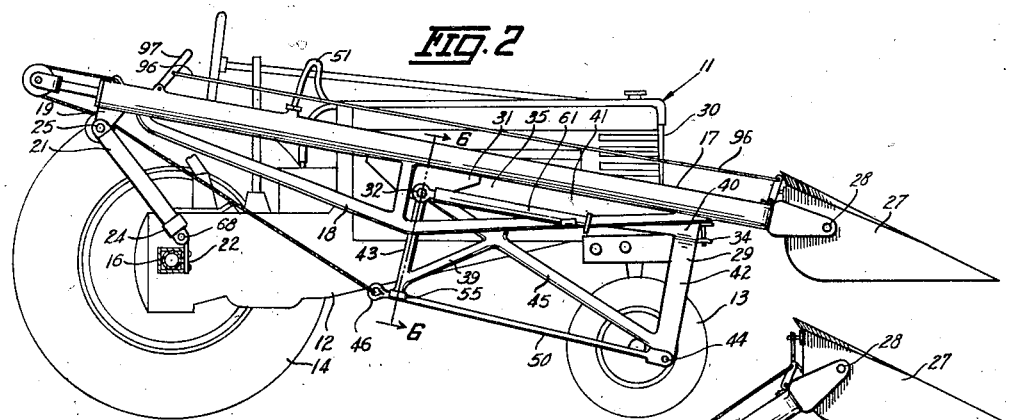
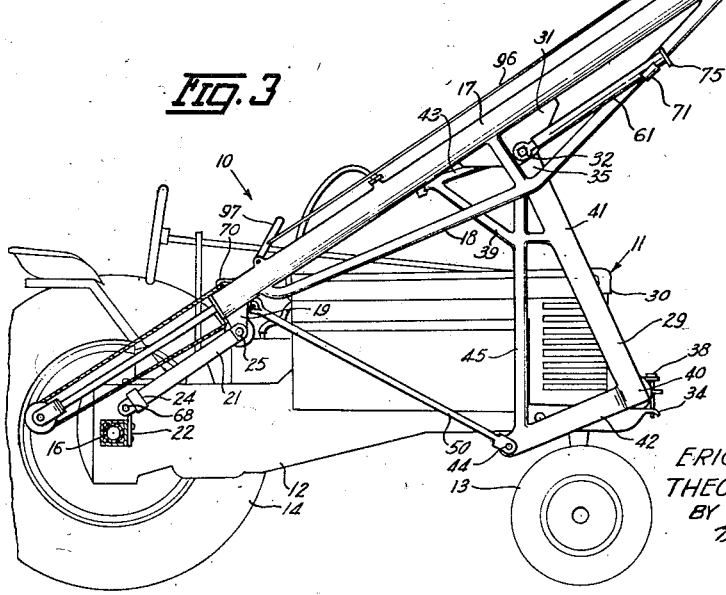
INVENTORS.
ERIC M. McELHINNEY
THEODORE A. PODHAJSKY
BY
ATTORNEY.

Feb. 5, 1957  E. M. McELHINNEY ET AL  2,780,374
LOADER MACHINE
Filed Jan. 27, 1954  2 Sheets-Sheet 2
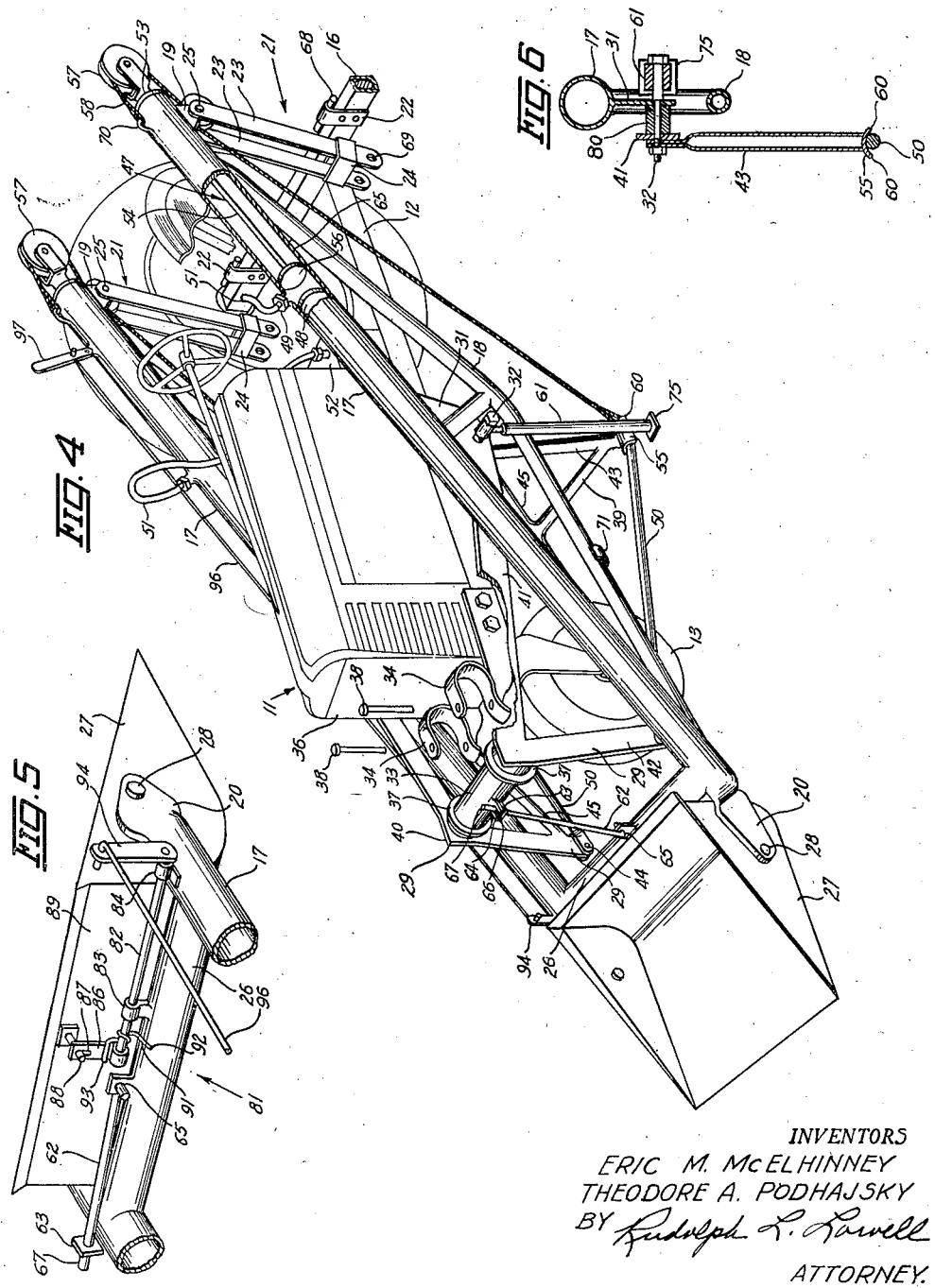
INVENTORS
ERIC M. McELHINNEY
THEODORE A. PODHAJSKY
BY Rudolph L. Lowell
ATTORNEY.

United States Patent Office 2,780,374
Patented Feb. 5, 1957

2,780,374

LOADER MACHINE

Eric M. McElhinney, Dysart, and Theodore A. Podhajsky, Traer, Iowa

Application January 27, 1954, Serial No. 406,526

5 Claims. (Cl. 214—140)

This invention relates generally to loading machines and in particular to a loader attachment for a farm tractor.

An object of this invention is to provide an improved loader machine.

Another object of this invention is to provide a tractor mounted loader attachment in which a load carrying unit is mounted between the front ends of a pair of pivoted and extensible lift booms such that upon movement of the booms to raise the load carrying unit from a ground engaging position to a transport position, the load carrying unit is maintained adjacent the front end of the tractor, and on a further upward movement of the booms, the load carrying unit is concurrently moved upwardly and forwardly to provide for the positioning of the load carrying unit a substantial distance forwardly of the tractor for dumping purposes.

A further object of this invention is to provide a loading machine having hollow lift booms mounted on a portable frame for concurrent upward and forward movement and in which the means for moving the booms is mounted within the booms.

A further object of this invention is to provide a tractor mounted loader attachment adapted to be supported on the tractor frame with a load carrying unit at the front end of the tractor so that during a loading operation, the front end of the tractor is maintained in a supported position on the ground surface.

Another object of this invention is to provide a loader attachment for a farm tractor which includes a load carrying scoop carried by lift booms embodied as a part of toggle systems which systems are operable to move the scoop longitudinally of the tractor.

Yet another object of this invention is to provide a tractor mounted loader attachment which includes means for independently supporting the attachment on the ground surface in a position such that a tractor driven between the lift booms for the attachment is capable of being quickly assembled with the attachment.

Still a further object of this invention is to provide a loader attachment for a farm tractor which is economical to manufacture, efficient in operation and readily and quickly assembled on the tractor.

Further objects, features and advantages of this invention will become apparent from a consideration of the following description when taken in connection with the accompanying drawing in which:

Fig. 1 is a side elevational view of the loader attachment of this invention shown in assembly relation with a farm tractor, with the loader attachment being shown in a loading position and with some parts broken away and other parts shown in section for the purpose of clarity;

Fig. 2 is a side elevational view similar to Fig. 1 but showing the loader attachment in a transport position;

Fig. 3 is a side elevational view similar to Figs. 1 and 2 showing the loader attachment in fully elevated or dumping position;

Fig. 4 is a perspective view of the loader attachment of this invention, shown in a ground supported position, prior to its assembly with a tractor;

Fig. 5 is a fragmentary rear perspective view of the scoop showing the scoop latching mechanism, and Fig. 6 is a detail sectional view as seen along the line 6—6 in Fig. 2.

With reference to the drawing, the loader attachment of this invention, indicated generally at 10, is illustrated in Figs. 1 to 3, inclusive, in assembly relation with a usual type farm tractor 11 having a main frame 12, steering wheels 13 and traction wheels 14 mounted on a rear axle 16.

The loader includes a pair of lift booms or arms 17 (Fig. 4), of a tubular construction, extended longitudinally of the tractor 11 on transversely opposite sides thereof. Tubular truss or brace units 18 are secured to the undersides of the booms 17. Each boom 17 is provided at its rear end with a downwardly extended ear or lug portion 19 which is pivotally connected at 25 to the upper end of a link unit 21 comprised of a pair of strap members 23 the upper ends of which straddle the lug 19. The lower end of a link unit 21 is pivotally connected at 68 to a bracket 22 carried on the tractor rear axle 16. The straps 23, which form a link unit 21, are provided with a rectangular clamp or clip member 24 which is slidable longitudinally of the straps or link members 23 for a purpose to appear later.

A tubular transverse beam 26 (Figs. 4 and 5) extends between the booms 17 at a position rearwardly of and adjacent the boom front ends 20. Supported on transverse pivots 28 carried by the boom front ends 20 and positioned forwardly of the transverse beam 26, is a scoop or load carrying unit 27.

It is seen, therefore, that the scoop 27 is carried between the front ends 20 of the lift booms 17, and that the rear ends of the booms 17 are pivotally connected to the link units 21. As best appears in Figs. 1–3, inclusive, relative angular or folding movement of the booms 17 and link units 21 is effective to move the scoop 27 longitudinally of the tractor 11. For example, when the link units 21 and booms 17 are somewhat folded relative to each other, as in Figs. 1 and 2, the scoop 27 is adjacent the tractor front end 30. When the link units 21 and booms 17 are unfolded or extended so as to be substantially parallel to each other as illustrated in Fig. 3, the scoop 27 is moved to a position substantially forwardly of the tractor front end 30. It can thus be seen that the booms 17 and link units 21 constitute toggle systems which are operable to move the scoop 27 forwardly and rearwardly relative to the tractor front end 30.

The lift booms 17 are raised and lowered by a pair of lift frames 29 (Figs. 1–4, inclusive) arranged on transversely opposite sides of the tractor 11 between the booms 17. The rear ends 35 (Figs. 3 and 6) of the lift frames 29 are supported on transverse pivots 32 carried by a pair of plates 31 secured to and extended downwardly from the booms 17. A tubular transverse connecting member or shaft 33, removably received within a pair of U-shape bearings or brackets 34 mounted at the front end of the tractor main frame 12 forwardly of the radiator 36, is secured at its ends to the front ends 40 of the lift frames 29. A pair of collars 37 on the transverse shaft 33 are positioned outwardly of and on opposite sides of the bearings 34 for maintaining the shaft 33 against movement transversely of the tractor 11. A pair of pins 38 extend downwardly through the legs of the bearings 34 at the front or open ends of the bearings 34, to maintain the member 33 against forward movement out of the bearings 34.

It is seen, therefore, that the lift frames 29 and shaft 33 form a unitary or integral structure and that when the shaft 33, which constitutes a common pivot for the front ends of the lift frames 29, is carried within the bearings 34, the lift frames 29 extend rearwardly in a straddling relation with the front end of the tractor 11, at positions between the tractor and corresponding booms or lift arms 17.

Each lift frame 29 (Figs. 1, 2 and 3) is of a substantially triangular shape, with the legs 41 and 42 thereof forming a substantially right angle and with the junction of such legs being secured to the transverse shaft 33 such that the leg 41 projects rearwardly and the leg 42 downwardly from the shaft 33. The legs 41 and 42 are connected by a brace member 45, which constitutes the third side of the triangle.

Integral with a lift frame 29, and projected therefrom at the rear end of the leg member 41 in the same direction, substantially parallel with, and of about the same length as the leg member 42, is a bearing or support extension 43. This extension 43 is braced with the leg member 45 with a connecting member 39. The junction of the support extension 43, and leg members 41 and 45, on each lift frame 29, carries a corresponding pivot 32, which as previously mentioned, is supported in a plate 31 (Fig. 6) secured to a corresponding boom 17.

The free or lower end of the leg member 42 has a transverse pivot 44 for pivotal connection with the front end of an elongated lift bar 50, which extends rearwardly from the pivot 44, and is of a length such that its rear end, which terminates in a loop 46, is arranged below and rearwardly of the free or lower end 55 of the support extension 43, when the booms 17 are in a loading position for the loader attachment. In this position of the booms 17, the rear end portions of the lift bars 50 are in bearing engagement with the lower ends 55 of the support extensions 43, and are held in such engagement by a pair of spaced projections 60, extended downwardly from the lower end 55 of the support extension.

Thus, by virtue of pivotal support of the lift frames 29 on the shaft 33, the pivot connections of the lift frames 29 on the pivots 32 with the booms 17, and the movable support of the booms 17 on the tractor rear axle 16 through the link units 21, an upward and forward swinging movement of the lift frames 29 effects an upward and forward movement of the booms 17.

For swinging the lift frames 29, a pair of hydraulic cylinder assemblies, indicated generally at 47 (Figs. 1 and 4), are incorporated in the rear ends of the booms 17. Since the hydraulic cylinder assemblies 47 are identical in construction and in their assembly with a corresponding boom 17 and lift frame 29, only one assembly 47 will be described in detail, with like parts being indicated by like numerals on the two assemblies.

As best appears in Figs. 1 and 4, a boom 17 has spaced from its rear end a transverse partition 48 in a fluid tight relation with the boom. At a position rearwardly of and adjacent the partition 48, the boom 17 is provided with a fluid connection or fitting 49 for attachment with one end of a flexible fluid conduit 51, which is in fluid communication with a source of fluid supply such as an oil pump indicated at 52. The rear end of the boom 17 is closed by a plate or cap 53 which functions as a guide or bearing for a piston rod 54 extended longitudinally of the boom 17 and centrally through the plate 53. At its inner end the piston rod 54 carries a piston 56, with that portion of the boom 17 between the partition 48 and the cap 53 constituting a cylinder 65 for the piston 56. The outer or rear end of the piston rod 54 supports a pulley 57 for rotation in a vertical plane. A flexible cable 58, trained about the pulley 57, is connected at one of its ends to the loop 46 at the rear end of the lift bar 50 for the corresponding lift frame 29, and at its other end to a loop 70 on the top side of the boom 17 adjacent the rear end thereof.

It is seen, therefore, that upon rearward movement of the piston rods 54 and associated pulleys 57 from the booms 17, the lift frames 29 are swung upwardly and forwardly by virtue of the upward and rearward force exerted by the cables 58 on the lift bars 50 which are arranged below the shaft 33 and in bearing engagement with the extension supports 43.

In the operation of the loader attachment 10 assume that the lift booms 17 are in their lower positions shown in Fig. 1. In this position of the booms 17, the link units 21 therefor are extended upwardly and rearwardly at angles of less than 90 degrees relative to the booms 17, and the lift frames 29 are extended rearwardly and slightly downwardly from the shaft 33. Thus, during a loading or bucking operation the force of the material being loaded on the scoop 27 is in part transmitted through the pivots 32 to the lift frames 29 and in part through the transverse shaft 33 to the front end of the tractor main frame 12. By virtue of such forces being at the front end of the tractor 11 and directed substantially horizontally any tendency of the tractor being tipped rearwardly about the axle 16 is substantially eliminated.

On the supply of fluid under pressure to the hydraulic cylinder assemblies 47, through the connections 49 therefor, the pistons 56 and their associated piston rods 54 and pulleys 57 are moved rearwardly of the booms 17. Since the cables 58 for the pulleys 57 are of constant lengths, such rearward movement of the pulleys 57 causes the cables 58 to exert upward and rearward pulling forces on the loops 46 at the rear ends of the lift bars 50. By virtue of the pivotal connections 44 of the lift bars 50 to the front leg members 42 and their bearing engagement with the extension supports 43, the lift frames 29 are thus swung in clockwise directions as viewed in Figs. 1 and 2 about the axis of the transverse shaft 33.

During the movement of the booms 17 from their lowered position in Fig. 1 to the transport position shown in Fig. 2 the link units 21 are initially swung downwardly and rearwardly about their pivotal connections 68 on the axle 16. Such rearward swinging movement of the link units 21 results from the upward movement of the boom supporting pivots 32 from positions below the level of the axis of the shaft 33, to positions level with or in a horizontal plane common to the axis of the shaft 33. Concurrently with this upward movement the pivots 32 are also moved rearwardly whereby the booms 17 are moved rearwardly. As a result of this initial rearward movement of the booms 17 the scoop 27 is moved toward and then away from the tractor front end so that in its transport position shown in Fig. 2 the scoop 27 is positioned adjacent the transverse shaft 33 at the front end of the tractor 11. A front overhanging of the bucket 27 and consequent side swinging movement thereof is eliminated, whereby the tractor is freely maneuverable for load transport purposes.

It is seen, therefore, that when the booms 17 are in their upwardly and rearwardly inclined positions in Fig. 1, corresponding to the loading position of the scoop 27, the supply of fluid to the cylinder assemblies 47, provides for the booms 17 being initially swung upwardly toward horizontal positions therefor concurrently with a rearward movement thereof, to effect a substantially vertical movement of the scoop 27 to its transport position shown in Fig. 2.

On a continued supply of fluid under pressure to the cylinder assemblies 47, the piston rods 54 are fully extended rearwardly from the booms 17, whereby to effect a continued upward and rearward force on the lift bars 50, through the cables 58, for swinging the lift frames 29 from their positions in Fig. 2 to their positions in Fig. 3. This upward and forward swinging of the lift frames 29 effects, through the pivots 32 and the link units 21, an upward and forward movement of the booms 17. Thus during the movement of the booms 17 from their positions in Fig. 2 the link units 21 are moved from positions extended upwardly and rearwardly from the tractor rear axle 16 to positions inclined upwardly and forwardly from the axle 16 and in a substantially parallel relation with the booms 17.

It is to be noted also that during this movement of the booms 17, the lift bars 50 are moved out of engagement with the extension supports 43, so that the upward and rearward force or pull by the cables 58 is applied only at the pivots 44 at the lower or free ends of the leg members 42. Thus, the lifting force applied on the lift frames 29 to raise the booms 17, is initially transmitted to the lift frames in part at the extension supports 43, to impart a first upward force to the rear end of the leg member 41, and a second rearward force to the lower or free end of the leg member 42, to provide complementary moment arms for swinging the lift frames 29, and with the moment of the leg member 41 being initially most effective on the lift frames 29. The effectiveness of the moment of the leg member 41 progressively decreases, with a concurrent progressive increase in the moment of the leg member 42, until a lift bar 50 and the cable length adjacent thereto are in a straight line relation. When this relation is reached the entire pull of the cable is applied only to the leg member 42 of a lift frame 29. The lift bars 50 move out of bearing engagement with the extension supports 43, when the booms 17 are in substantially horizontal positions.

Because of the concurrent upward and forward movement of the booms 17, the scoop 27 in its dumping position shown in Fig. 3 is raised to a height and to a position forwardly of the tractor that would be attained by a boom having an overall length equal to the combined length of a boom 17 and its corresponding link unit 21. Thus a boom 17 and its associated link unit 21 constitute what might be termed a folding boom structure, hinged at 25, and with the structure remaining folded for loading and transport positions of the scoop 27, to retain the scoop adjacent the front end of the tractor, and then unfolding as the scoop is moved from a transport position to a dumping position, to provide ample clearance of the scoop and tractor with a vehicle to be loaded.

The scoop 27 is releasably locked in a load carrying position by a latch mechanism indicated generally as 81 in Fig. 5. The latch mechanism 81 includes a rock shaft 82 rockably supported in bearings 83 and 84 mounted on the top side of the transverse beam 26 and a boom 17, respectively. An upright latch 86 mounted on the inner end of the rock shaft 82 has a slotted opening 87 adjacent to its free end which is adapted to receive, in locking engagement, a catch member 88 extended rearwardly from the back wall 89 of the scoop 27. The latch 86 is yieldably maintained in engagement with the catch 88 by a torsion spring 91 mounted on the rock shaft 82, which has one end 92 engageable with the connecting member 26 and its opposite end 93 engageable with the rear side of the latch 86.

An upright rock arm 94 mounted on the outer end of the rock shaft 82, has its free end pivotally connected with the front end of a link 96, the rear end of which is pivoted to an upright pivoted lever 97 pivotally supported on a lift boom 17 (Figs. 1 to 4 inclusive).

To dump the scoop 27, the handle 97, which is arranged at a position conveniently accessible to the tractor operator, is pulled rearwardly whereby the latch 86 is moved rearwardly against the action of the spring 91 out of an engaged position with the catch 88. The scoop 27 is returned to its load carrying position by gravity, as a result of the assembly of the scoop 27 on the pivots 28 in a manner such that when empty the scoop rear end over balances the scoop front end.

Once the contents of the scoop 27 has been dumped, the booms 17 are returned by gravity from their upper positions shown in Fig. 3 to their lower positions shown in Fig. 1 by merely releasing the pressure on the fluid supply 52. On release of such pressure, the weight of the scoop 27 and the weight of the lift frames 29 and booms 17 act to swing the booms 17 downwardly. The movement of the lift bars 50 toward their positions shown in Fig. 1 moves the pulleys 57 toward the rear ends of the booms 17, causing a resultant movement of the pistons 56 toward the partitions 48 such that the oil within the cylinder assemblies 47 is forced outwardly through the passages 51 and back into the fluid supply unit 52.

The loader attachment 10 is readily detached from the tractor 11 by merely dropping the scoop 27 to a ground supported position (Fig. 1). A pair of tubular standards or legs 61, carried on the transverse pivots 32 on the depending boom plates 31 (Figs. 4 and 6) at positions outwardly of the plates 31, and normally extended substantially parallel to the booms 17 with their free ends 75 carried on bracket supports 71 extended outwardly from the truss units 18, are swung clear of the supports 71 and the free ends 75 of the standards are supported on the ground surface.

A brace 62 (Figs. 4 and 5) pivoted at 65 on the transverse beam 26, has a transverse stop 63 and an end portion 67 positioned outwardly of the stop 63. The brace 62 is swung upwardly from its Fig. 5 position to a position in which the brace end portion 67 is received in an upright slot 66 formed in a horizontal projection 64 on the front side of the shaft 33 (Fig. 4), with the stop 63 engaging the underside of the projection 64.

The pins 38 for the bearings 34 are removed, the fluid lines 51 are disconnected from the supply unit 52, and the clamps 24 are moved upwardly on the link members 23 and the lower ends of the links 23 are moved apart and disengaged from the pins 68. Thus, on rearward driving movement of the tractor 11, the rear axle 16 is moved rearwardly away from the link units 21 and the bearings 34 are moved rearwardly out of their positions about the shaft 33.

It is seen, therefore, that in the detached position of the attachment 10, the scoop 27 is ground supported and the transverse shaft 33 is maintained in an elevated position, corresponding to the vertical position of the bearings 34 on the tractor 11, by the brace 62. The attachment 10 is thus provided with a three point support, namely, the standards 61 and the scoop 27, when detached from the tractor 11. It is apparent, therefore, that with this three point support and with the center of gravity for the attachment 10 being between the scoop 27 and the standards 61, the attachment 10 is firmly supported on the ground in its tractor detached position shown in Fig. 4. Further, the booms 17 are supported by the standards 61 at a desired inclination for quick attachment to the tractor 11.

In re-assembling the attachment 10 on the tractor 11, the tractor is driven forwardly between the lift booms 17, until the bearings 34 are positioned about the shaft 33 which is supported at the level of the bearings 34 by the brace 62. The pins 38 are inserted through the legs of the bearings 34 to maintain the shaft 33 within the bearings 34. The lower ends of the links 23 are connected with the pins 68 on the axle 16, by positioning opposite ends of the pins 68 within openings 69 in the lower ends of the links 23 and the clamps 24 are moved to positions adjacent the pins 68 to maintain such connections. The brace 62 is disengaged from the projection 64 on the shaft 33 and returned to its rest position on the transverse beam 26 as shown in Fig. 5. The fluid lines 51 are connected to the supply unit 52 which is then operated to supply fluid to the cylinder assemblies 47 to raise the lift booms 17 a distance sufficient to raise the free ends 75 of the standards 61 above the ground surface. The standards 61 which are then freely swingable on the pivots 32, are swung upwardly and forwardly and supported adjacent their free ends 75 on the bracket supports 71.

It is seen, therefore, that by merely manipulating the standards 61, brace 62, bearing pins 38, and the connections of the link units 21 to the pins 68, the attachment 10 is readily assembled on and detached from the tractor 11.

From a consideration of the above description, it is seen, that this invention provides a loading machine in which a pair of lift booms 17 cooperate with a corresponding pair of link units 21 to provide toggle systems for moving the booms 17 longitudinally of the tractor 11. Thus, the booms 17 and link units 21 constitute toggle members which are maintained in a folded relation when the scoop 27 is in its loading and transport positions shown in Figs. 1 and 2, respectively, to provide for the rigid support of the scoop 27 at a position adjacent the tractor front end 30. However, on movement of the scoop 27 toward its elevated or dumping position (Fig. 3), the toggle members 17 and 21 are rapidly unfolded to provide for a forward movement of the booms 17 and a corresponding forward movement of the scoop 27 to provide for the scoop 27 being positioned substantially ahead of the tractor front end 30 in the elevated position of the scoop.

The lift frames 29 provide the actuating force for such relative movement of the toggle members 17 and 21 to accomplish the above described movement of the scoop 27. Thus, during the movement of the scoop 27 from its lower ground engaging position shown in Fig. 1 to its transport position shown in Fig. 2, the arcs prescribed by the pivotal connections 32 of the lift frames 29 to the booms 17 approximate substantially vertical paths. However, on further swinging movement of the lift frames 29 to move the booms 17 from their Fig. 2 position to their Fig. 3 position, the arcs prescribed by the pivots 32 are in directions inclined upwardly and forwardly.

Importantly, it is to be noted that in a bucking operation, with the scoop 27 in the position shown in Fig. 1, each pivot 32 is arranged below a line extended between the shaft 33 and the pivot 25 for the corresponding boom 17. As a result, the rearward forces on the scoop 27, which act to exert a clockwise moment on the booms 17, as viewed in Fig. 1, are transmitted to the pivots 32 as downwardly directed forces. By virtue of the connection of the pivots 32 to the booms 17 and the support of the scoop 27 on the booms 17, these downwardly directed forces act to hold the scoop 27 against the ground surface. In effect, therefore, the booms 17 are locked in their Fig. 1 positions during a bucking operation.

Further, in the loader attachment 10 of this invention, the hydraulic cylinder assemblies 47 for moving the booms 17 during a loading operation, are incorporated in the booms 17, to thereby eliminate the need for extra space consuming structure on the tractor 11 during use of the loader attachment 10. As a result of this compact construction of the loader 10, and as best appears in Figs. 1 to 4, inclusive, in the loading and transport operations of the loader attachment 10, the tractor operator is afforded a full forward visibility, so that only in the dumping position of the scoop 27 is such visibility impaired. Further, in all positions of the loader attachment 10 the tractor operator is afforded a full visibility to either side of the tractor 11.

Although the invention has been described with respect to a preferred embodiment thereof, it is to be understood that it is not to be so limited, since changes can be made therein which are within the full intended scope of this invention as defined by the appended claims.

We claim:

1. A loading machine comprising a main frame, a pair of elongated lift arms arranged at opposite sides of said frame and having tubular rear end portions, means for pivotally supporting the rear ends of said lift arms on said main frame, a pair of lift frames corresponding to said lift arms and pivotally mounted on said main frame forwardly of the pivotal supports for said lift arms, said lift frames including rearwardly extended portions pivotally connected to said lift arms intermediate the ends thereof, a pair of pistons mounted in said tubular lift arm portions for movement longitudinally of said lift arms, piston rods on said pistons projected outwardly from the rear ends of said lift arms, means for supplying fluid under pressure to said tubular portions to move said pistons, flexible connecting members connected to and extended between said lift arms and said lift frames and arranged so as to be movable by said piston rods, with said connecting members being connected to said lift frames such that movement of said pistons operates to raise and lower said lift arms.

2. A loader attachment for a tractor having a front axle provided with ground wheels and a main frame comprising, a pair of substantially straight lift booms extended longitudinally of the tractor on opposite sides thereof, a load carrying unit mounted at the front ends of said booms at a position forwardly of the tractor, a pair of link members corresponding to said lift booms, with each link member having one end pivotally connected to a corresponding lift boom adjacent the rear end thereof and an opposite end pivotally connected to said main frame adjacent the rear end thereof, a pair of lift frames corresponding to said lift booms, with each lift frame being pivoted on said main frame adjacent the front end thereof at a position forwardly of the front axle for up and down movement of the rear end of said lift frame, each of said lift frames including a rearwardly extended portion pivotally connected to a corresponding boom intermediate the ends thereof for moving said boom between a lowered position folded relative to a corresponding link and an elevated position parallel to said link, with each boom in a lowered position therefor being inclined upwardly and rearwardly and having the lift frame therefor arranged substantially below the level of the rear end of said boom.

3. A loading machine comprising a main frame, a pair of foldable boom structures extended longitudinally of said tractor on opposite sides thereof, each of said boom structures including a first tubular portion and a second portion pivotally connected to said tubular portion for folding and unfolding movement relative thereto, means pivotally connecting the rear ends of said boom structure to said main frame, lift frame means movably mounted on said main frame for raising and lowering said boom structures concurrently with folding and unfolding said boom structures, a pair of pistons mounted for movement within said tubular boom portions, means for supplying fluid under pressure to said tubular portions to move said pistons, and a pair of flexible connecting members connected to and extended between said boom structures and said lift frame means and operatively associated with said pistons for operation by said pistons to move said lift frame means, and with said lift frame means being operable to initially raise said boom structures from lowered folded positions therefor to intermediate folded positions and to raised unfolded positions.

4. A loader attachment for a tractor having a rear axle, a main frame, and a bearing member on the front end thereof, said attachment comprising a lift unit including a pair of lift arms spaced apart a distance to receive the tractor therebetween and having a load carrying unit mounted between the front ends thereof, a pair of link members pivotally attached at one of their ends to and extended downwardly from the rear ends of said lift arms for pivotal connection of the free ends thereof with said rear axle, a lift structure comprising a pair of transversely spaced lift frames pivotally connected at their rear ends to intermediate portions of said lift arms and connected together at their front ends by a shaft receivable in said bearing member, said attachment, in one position thereof, having the load carrying unit ground supported with said lift arms extended upwardly and rearwardly therefrom, brace means movably mounted on said lift unit and engageable with said lift structure to support said shaft substantially at the level of said bearing member, ground engaging standards movably mounted on said lift arms intermediate the ends thereof for supporting said lift arms at a position such that the free ends of said link members are connectible with said rear axle, whereby the tractor is movable to a position between said lift arms for assembly of the attachment thereon.

5. A loader attachment for a tractor having a main frame and a rear axle, said attachment comprising a lift unit including a pair of boom structures spaced apart a distance to receive the tractor therebetween and having a load carrying unit mounted between the front ends thereof, a first coacting member on said attachment adapted to engage a second coacting member adjacent the front end of said tractor to provide for a partial support of said attachment on said tractor, said attachment in one position thereof having the load carrying unit in a ground supported position with said boom structures extended upwardly and rearwardly therefrom, brace means on said lift unit for maintaining said first coacting member at a position for engaging said second coacting member, and ground engaging standards movably mounted on said lift unit rearwardly of said load carrying unit for supporting said boom structures at a position such that rear end portions thereof are connectible with said rear axle in said one position of said attachment, whereby said tractor is movable to a position between said boom structures for assembly of the attachment on the tractor.

References Cited in the file of this patent

UNITED STATES PATENTS

| | | |
|---|---|---|
| 1,888,925 | Kroyer et al. | Nov. 22, 1932 |
| 2,538,000 | Hoar et al. | Jan. 16, 1951 |
| 2,563,974 | Thierry | Aug. 14, 1951 |